(12) United States Patent
Trickle

(10) Patent No.: US 9,821,603 B2
(45) Date of Patent: Nov. 21, 2017

(54) METHOD OF ASSEMBLING A WHEELED PACKAGE

(71) Applicant: Staunton Capital Incorporated, Gastonia, NC (US)

(72) Inventor: Chad Lee Trickle, Iron Station, NC (US)

(73) Assignee: Staunton Capital Incorporated, Gastonia, NC (US)

( * ) Notice: Subject to any disclaimer, the term of this patent is extended or adjusted under 35 U.S.C. 154(b) by 0 days.

(21) Appl. No.: 15/416,072

(22) Filed: Jan. 26, 2017

(65) Prior Publication Data

US 2017/0129283 A1    May 11, 2017

Related U.S. Application Data

(62) Division of application No. 14/751,422, filed on Jun. 26, 2015, now Pat. No. 9,586,442.

(51) Int. Cl.
*B60B 33/06* (2006.01)
*B60B 33/00* (2006.01)

(52) U.S. Cl.
CPC .......... *B60B 33/06* (2013.01); *B60B 33/0005* (2013.01)

(58) Field of Classification Search
None
See application file for complete search history.

(56) References Cited

U.S. PATENT DOCUMENTS

| | | | |
|---|---|---|---|
| 1,019,302 A | 3/1912 | Butcher | |
| 1,050,352 A | 1/1913 | Deutschman | |
| 2,425,875 A | 8/1947 | Hermann | |
| 2,468,399 A * | 4/1949 | Grossman | ............... B60B 33/00 16/18 R |
| 2,472,491 A | 6/1949 | Quinton | |
| 2,484,951 A | 10/1949 | Kubo | |
| 2,490,953 A | 12/1949 | Eriksen | |
| 2,524,819 A | 10/1950 | McKean | |
| 3,260,533 A | 7/1966 | Ryder | |
| 4,249,282 A | 2/1981 | Little | |
| 4,575,109 A | 3/1986 | Cowdery | |
| 4,922,574 A | 5/1990 | Heiligenthal et al. | |
| 5,328,000 A | 7/1994 | Rutter et al. | |
| 5,365,635 A * | 11/1994 | Jang | ....................... A45C 5/145 16/34 |
| 5,375,294 A | 12/1994 | Garrett | |

(Continued)

FOREIGN PATENT DOCUMENTS

GB    2338221 A    12/1999

*Primary Examiner* — John Walters
*Assistant Examiner* — Hilary L Johns
(74) *Attorney, Agent, or Firm* — JK Intellectual Property Law, PA

(57) ABSTRACT

A method of assembling a wheeled package includes providing a package having an exterior surface with at least one cavity, and inserting a retractable caster assembly at least partially into the cavity. The retractable caster assembly includes a frame and a caster wheel assembly with a wheel and two guide members configured to be movable along slots within the frame so that: when the caster wheel assembly is at a first end of the slots the wheel is in a retracted position substantially within the cavity; and when the caster wheel assembly is at a second end of the slots the wheel is in an extended position extending from the cavity.

18 Claims, 4 Drawing Sheets

(56) References Cited

U.S. PATENT DOCUMENTS

| | | | |
|---|---|---|---|
| 6,507,975 B2* | 1/2003 | Maupin | B60B 33/0005 16/19 |
| 7,360,783 B2 | 4/2008 | Home | |
| 7,731,221 B2 | 6/2010 | Bess | |
| 7,784,816 B2 | 8/2010 | Jian | |
| 8,141,885 B2* | 3/2012 | Fan | B60B 33/0007 16/32 |
| 2006/0267295 A1* | 11/2006 | You | B60B 19/00 280/5.28 |
| 2011/0291534 A1 | 12/2011 | Li et al. | |
| 2012/0133261 A1 | 5/2012 | Yuan et al. | |
| 2012/0180259 A1 | 7/2012 | Frame | |
| 2015/0174977 A1 | 6/2015 | Shahroodi | |
| 2015/0306908 A1 | 10/2015 | Sharratt et al. | |

\* cited by examiner

METHOD OF ASSEMBLING A WHEELED PACKAGE

RELATED APPLICATIONS

The present application claims priority to and is a divisional application of U.S. patent application Ser. No. 14/751,422, filed Jun. 26, 2015, which application is incorporated by reference herein in its entirety.

TECHNICAL FIELD

This present disclosure relates generally to the field of caster assemblies having wheels capable of retraction, to related wheeled package designs, and to assembly methods.

BACKGROUND

Wheeled devices such as skid loaders, forklifts, hand trucks, etc. have been used to transport objects or groups of objects. One or more objects are placed on such devices, and then the devices are moved by via rolling the wheels by pushing, driving, etc. Other objects incorporate wheels (such as caster assemblies) to allow the objects to be moved about without use of another wheeled device. Furniture, carts, tools, outdoor grills, and many other objects have been constructed with such wheels to allow selective movement.

While the currently-available wheel designs function well in their intended applications, further development of wheeled devices and packages that provide benefits such as reliable, efficient, and/or cost-effective movement or any other benefit would be welcome.

SUMMARY

According to certain aspects of the disclosure, a retractable caster assembly includes a caster wheel assembly having a body, a yoke attached to the body, an axle attached to the yoke, a wheel rotatably mounted to the axle, and two guide members attached to and extending outwardly from the body. A frame has two plates spaced from each other, each plate defining a slot having a first end and a second end. The plates are oriented so that the slots are aligned. The guide members extend through the slots so that the caster wheel assembly is movable along the slots as guided by the guide members. The slots and caster wheel assembly are configured so that when the caster wheel assembly is at the first end of the slots the wheel is in a retracted position, and so that when the caster wheel assembly is at the second end of the slots the wheel is in an extended position. Various options and modifications are possible.

For example, each second end may include a shoulder defining an intermediate position for the caster wheel assembly and a receiver defining a locked position for the caster wheel assembly. The receiver may include two indentations sized for receiving the guide members.

Also, each guide member may include a rod and at least one detachable fastener, wherein each detachable fastener may include a fastener securable in an opening within a respective rod. The fastener may have a head, the head and slots sized to cooperate maintain caster wheel assembly within the slots. Each detachable fastener may also include a cotter pin for securing the fastener to the respective rod. Also, rod may define an opening therethrough to form a hollow tube. At least one bearing assembly may be provided, the bearing assembly allowing the yoke to rotate relative to the body.

The frame and caster wheel assembly may be sized so that the caster wheel assembly may move freely between the first and second ends of the slots. If so, the frame and caster wheel assembly may be configured such that gravity may cause such free movement between the first and second ends of the slots when orientation of the frame is altered accordingly.

The frame may have a central portion joining the two plates. The frame and caster wheel assembly may be configured so that when the caster wheel assembly is in the first position, the wheel does not extend past a containment limit. The containment limit may be defined by a bottom edge of the frame.

According to certain other aspects of the disclosure, a wheeled package may include a package having an exterior surface, the exterior surface defining at least one cavity, a frame located at least partially within the cavity, the frame having two plates spaced from each other, each plate defining a slot having a first end and a second end, the plates being oriented so that the slots are aligned, and a caster wheel assembly. The caster wheel assembly may have a body, a yoke attached to the body, an axle attached to the yoke, a wheel rotatably mounted to the axle, and two guide members attached to and extending outwardly from the body. The guide members may extend through the slots so that the caster wheel assembly is movable along the slots as guided by the guide members. The slots and caster wheel assembly may be configured so that when the caster wheel assembly is at the first end of the slots the wheel is in a retracted position substantially within the cavity, and so that when the caster wheel assembly is at the second end of the slots the wheel is in an extended position extending from the cavity. Various options and modifications are possible.

For example, each second end may include a shoulder defining an intermediate position for the caster wheel assembly and a receiver defining a locked position for the caster wheel assembly. The receiver may also include two indentations sized for receiving the guide members. At least one bearing assembly may be provided allowing the yoke to rotate relative to the body.

The cavity, frame and caster wheel assembly may be sized so that the caster wheel assembly may move freely between the first and second ends of the slots. Also, the cavity, frame and caster wheel assembly may be configured such that gravity may cause such free movement between the first and second ends of the slots when orientation of the package is altered accordingly.

The frame may have a central portion joining the two plates. The cavity, frame and caster wheel assembly may be configured so that when the caster wheel assembly is in the first position, the wheel does not extend past a containment limit. The containment limit may be defined by a bottom edge of the frame, or by a portion of the exterior surface adjacent the cavity. The cavity may be larger than the frame in a lateral direction so that the wheel can extend into the cavity past the frame when the caster wheel assembly is in the first position. The package may have two of the cavities, each cavity holding one of the frames and one of the caster wheel assemblies.

According to certain other aspects of the disclosure, a method of assembling a wheeled package may include the steps of: providing a package a having an exterior surface, the exterior surface defining at least one cavity; and inserting a retractable caster assembly at least partially into the cavity, the retractable caster assembly including a frame and a caster wheel assembly, the caster wheel assembly including a wheel and two guide members configured to be movable along slots within the frame so that when the caster wheel assembly is at a first end of the slots the wheel is in a retracted position substantially within the cavity, and so that when the caster wheel assembly is at a second end of the slots the wheel is in an extended position extending from the cavity. Various options and modifications are possible.

For example, the method may further including the step of orienting the package so that the caster wheel assembly slides to the second end of the slots, and the further step of rolling the package on the wheels.

The method may also include the further step of orienting the package so that the caster wheel assembly slides to the first end of the slots, and the further step of placing the package in a desired location.

If desired, each second end may include a shoulder defining an intermediate position for the caster wheel assembly and a receiver defining a locked position for the caster wheel assembly. The receiver may include two indentations sized for receiving the guide members. The cavity, frame and caster wheel assembly may be configured such that gravity may cause such free movement between the first and second ends of the slots during the orienting steps. Each package may have at least two of the cavities, and the method may include inserting a respective retractable caster assembly at least partially into each cavity.

DETAILED DESCRIPTION

Figure 1:
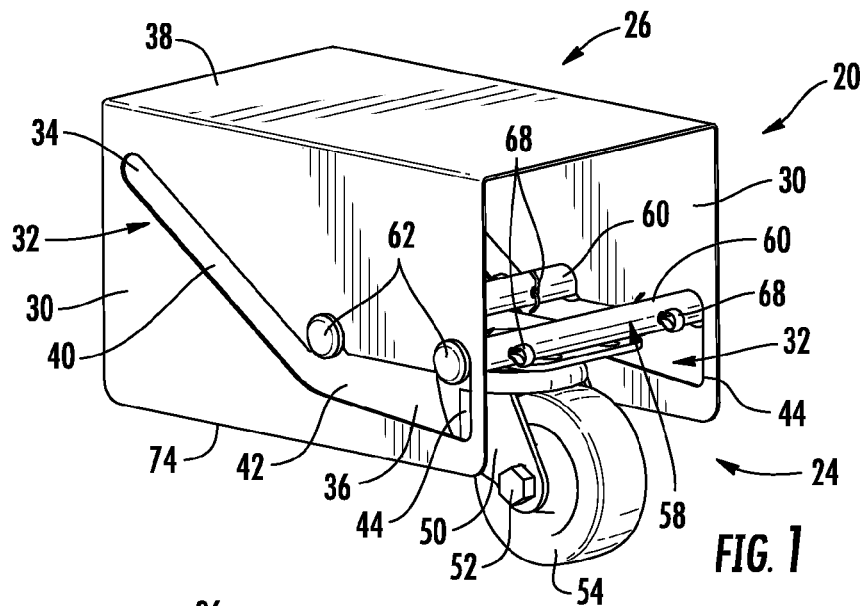
FIG. 1 is a perspective view of a retractable caster assembly according to certain aspects of the disclosure.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

FIGS. 1-11 generally show a retractable caster assembly 20 useful for creating a wheeled package 22, possibly by using a method of creating such a wheeled package as detailed below. Retractable caster assembly 20 as illustrated herein includes a caster wheel assembly 24 and a frame 26.

Before discussing specific elements below, it should be understood that the examples shown of caster wheel assembly 24 and frame 26 are exemplary only, and that many other types of wheel assemblies and frames could be used. Also, wheeled package 22 as illustrated is a shipping box 28 (e.g., of cardboard) with two retractable caster wheel assemblies 20. It should be understood that box 28 is just one example of a shape, configuration, size and material construct of a box, carton, container, etc. that could be used and should not be considered to be limiting.

Returning to FIGS. 1-4, frame 26 of retractable caster assembly 20 has two spaced-apart plates 30. Each plate 30 defines a slot 32 that runs along the respective plate from a first end 34 to a second end 36. Plates 30 are oriented with respect to each other so that slots 32 are substantially aligned with each other (when viewed from the direction of FIG. 2).

A central portion 38 of frame 26 joins the two plates 30. As illustrated, central portion 38 and plates 30 generally form a u-shape or channel-shape, which is useful in terms of manufacturing frame 26 from a single (e.g., stamped and folded) sheet of metal. However, it should be understood that in some applications, central portion 38 might not be needed. Also, central portion 38 could have other configurations, shapes and locations on frame, and/or may not be formed unitarily with plates 30. In this regard, central portion 38 could be separate structures such as an additional plate or plates attachable to plates 30, for example, by sliding tabs into slots, snap-fits, or the like. Central portion 38 could also comprise threaded or other types of fasteners extending between plates 30, or many other types and configurations of structures could be used.

Figure 2:
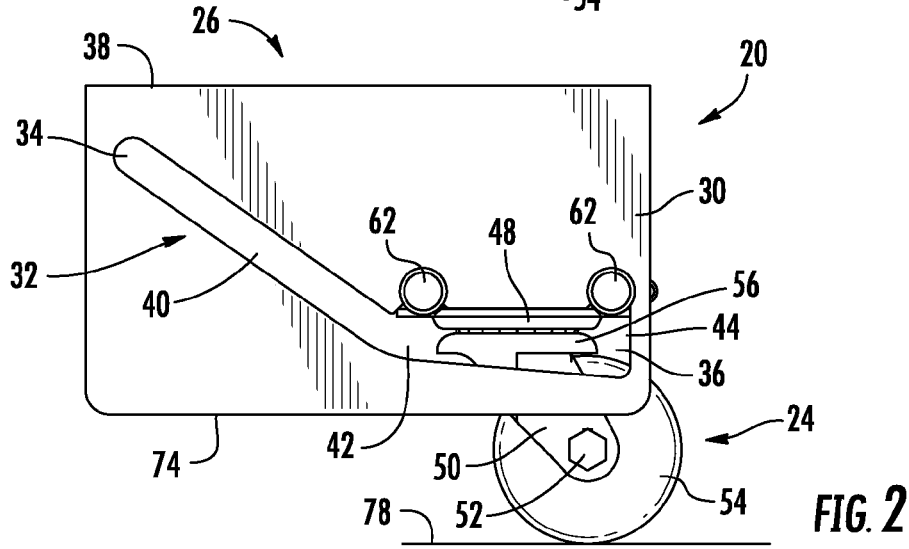
FIG. 2 is a side view of the assembly of FIG. 1.
Figure 3:
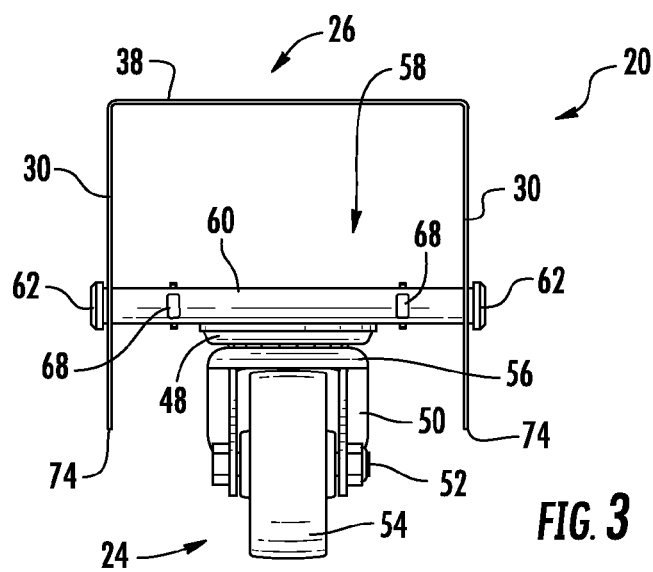
FIG. 3 is an end view of the assembly of FIG. 1.
Figure 4:
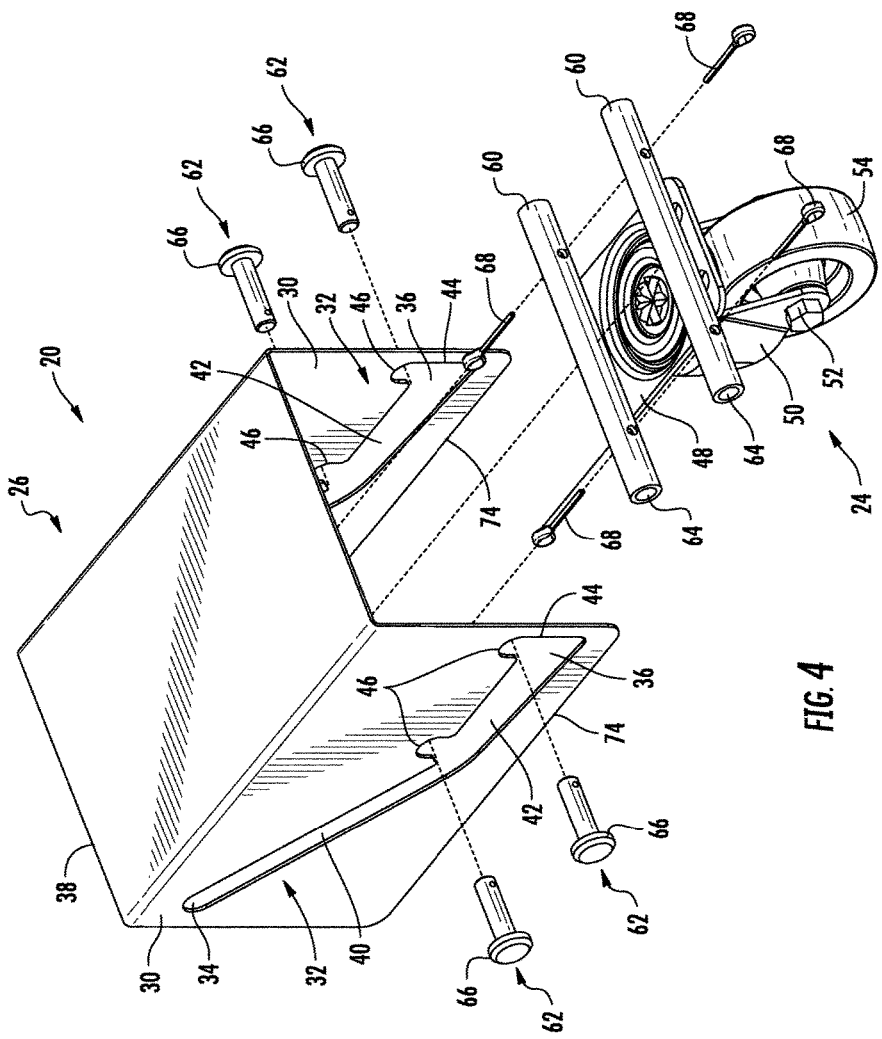
FIG. 4 is a partially-exploded, perspective view of the assembly of FIG. 1.

Slots 32 may be configured with a first slanted portion 40 adjacent first end 34 and a second slanted portion 42 adjacent second end 36. A shoulder 44 at second end 36 defines an intermediate position for the caster wheel assembly 24. A receiver, which may comprise two indentations 46, defines a locked position for the caster wheel assembly 24, as shown in FIGS. 1-3. The function of slot 32 and its various portions will be discussed below after introducing related parts of caster wheel assembly 24.

Caster wheel assembly 24 may be for example a substantially conventional caster assembly of various types, generally including a body 48, a yoke 50 attached to the body, an axle 52 attached to the yoke, and a wheel 54 rotatably mounted to the axle. Typically, one or more bearing members 56 are present between body 48 and yoke 50 allowing the yoke to swivel around a substantially vertical (as illustrated) axis. Caster wheel assembly 24 may or may not include a kingpin or a precision bearing. Thus, various types of caster wheel assemblies could be used according to the present disclosure.

Two guide members 58 are attached to and extend outwardly from body 46. Guide members 58 may be permanently fixed to body 46 by welding, brazing, etc. Alternatively, guide members 58 could be removably attached to body 46 by fasteners, clips, slots and tabs, etc.

Guide members 58 as illustrated include a rod 60 and at least one detachable fastener 62 securable in an opening 64 in the rod. Each fastener 62 has a head 66, the head and slots 32 in plates 30 sized to cooperate maintain caster wheel assembly 24 within the slots. If desired, at least one of the fasteners 62 may be removably detachable from its rod 60, for example by way of a cotter pin 68, or alternatively by way of threads. If desired, the opening 64 in each rod 60 may extend through the rod so as to form a hollow tube.

Figure 5:
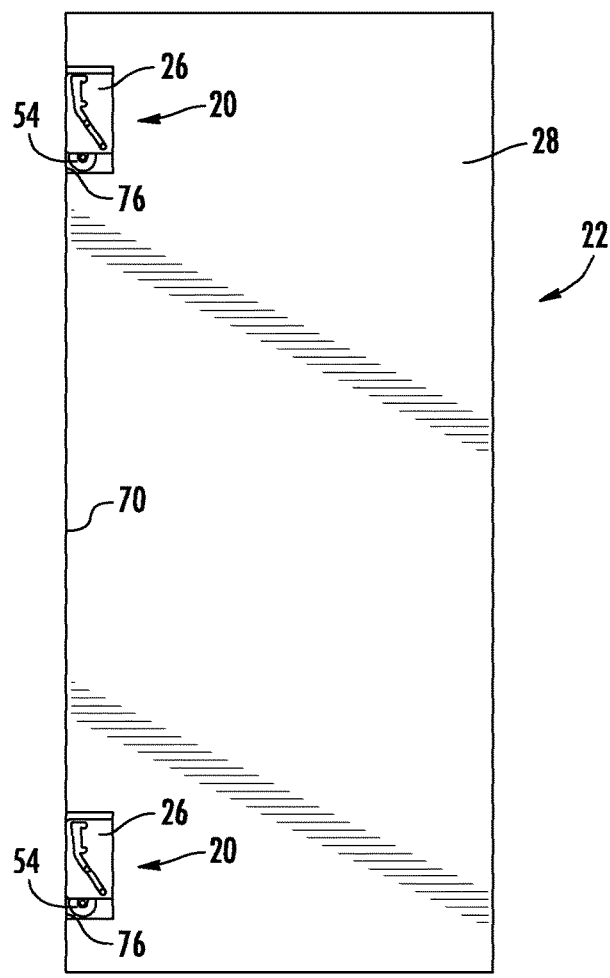
FIG. 5 is a diagrammatic side view of a package incorporating two assemblies as in FIG. 1, with wheels in a retracted position.
Figure 6:
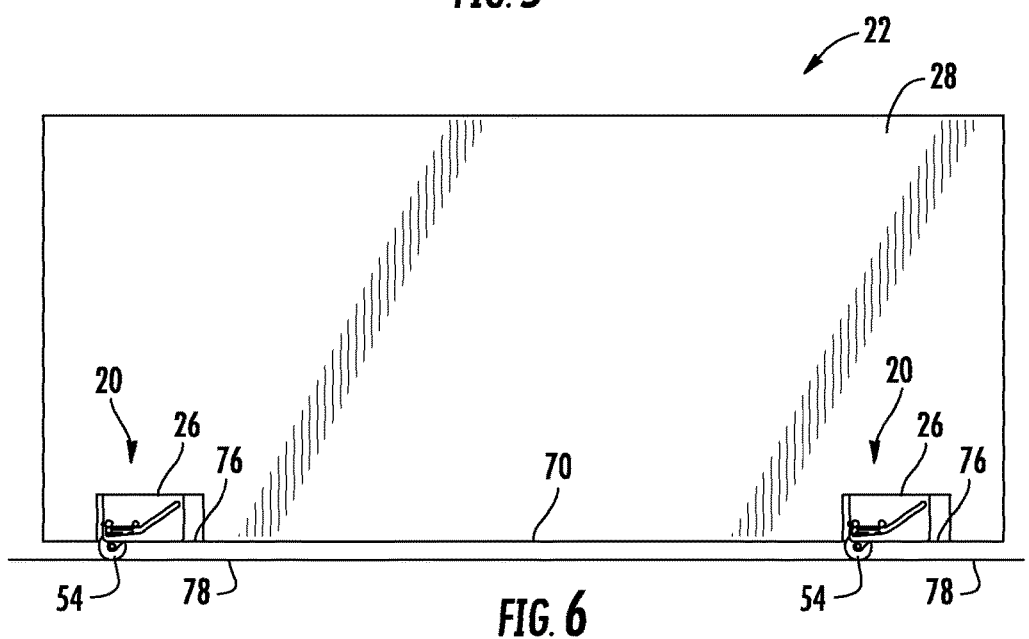
FIG. 6 is a diagrammatic side view as in FIG. 5, with wheels in an extended position.

FIGS. 5 and 6 show one example of a package 22 into which retractable caster assemblies 20 may be placed. Package 22 may be, for example, a conventional cardboard box used for shipping a piece of merchandise, a cardboard and wooden box, a wooden box, a plastic box, or any other type of container. Package 22 has an outer surface 70 defining at least one cavity 72.

Cavity 72 should be sized to receive retractable caster assembly, and may be slightly longer than frame 26 in a lateral direction (up and down as shown in FIG. 5) to allow space for wheel 54 to extend in the position of FIG. 5. If frame 26 is a channel-shaped element as shown in FIGS. 1-4, then cavity 72 may be shaped correspondingly, or at least shaped in some fashion to securely receive frame 26. A holder element (not shown) such as a pin, screw, glue, tab, hook and loop fastener, strap, shoulder, friction fit portion, etc. may be employed to hold frame 26 in cavity 72. Cavity 72 may be have side walls covering adjacent plates 30.

If desired, frame 26 may be removably attachable to cavity 72 so as to be removable and reusable with other packages. Alternatively, frame 26 and caster assembly 20 may be made for single use with package 22 and then disposed of or recycled with the package.

Slots 32 and caster wheel assembly guide members 58 are configured so that when caster wheel assembly 24 is at first end 34 of the slots wheel 54 is in a retracted position relative to frame 26 and cavity 72 (see FIG. 5). Slots 32 and guide members 58 of caster wheel assembly 24 are also configured so that when the caster wheel assembly is at second end 36 of the slots wheel 54 is in an extended position (see FIG. 6). These elements are sized so that reorientation of the package between the positions of FIG. 5 and FIG. 6 allows guide members 58 to slide freely along slots 32 so that caster wheel assembly 24 may freely move between first end 34 and second end 36 of the slots.

It can be said that cavity 72, frame 26 and caster wheel assembly 24 are configured so that when the caster wheel assembly is in the first position, wheel 54 does not extend past a containment limit. In other words, when caster wheel assembly 24 is in the first position, wheel 54 does not protrude beyond a predetermined position (downward as shown in FIGS. 1-4). That containment limit is defined by a bottom edge 74 of frame 26 and/or a portion 76 of exterior surface 70 adjacent cavity 72. Edge 74 and portion 76 may or may not be coincident in all applications once frames 26 are installed in cavities 72. Although it is possible to have wheels 54 protrude some from frame 26 or cavity 72 when caster wheel assembly 24 is in the first position, such may not allow for tight stacking of packages in some situations, as compared to an arrangement with wheels essentially stowed within the package. Similarly, it is possible to attach frames 26 to packages without cavities, but then the frames would protrude beyond the package surface, again possibly limiting stacking or handling. It should be understood that some aspects of the invention permit the wheels or frame to protrude from the cavity and or package.

FIGS. 7-11 illustrate the position of caster wheel assembly 24 relative to frame 26 as the frame is rotated (either alone or as attached to a package).

Figure 7:
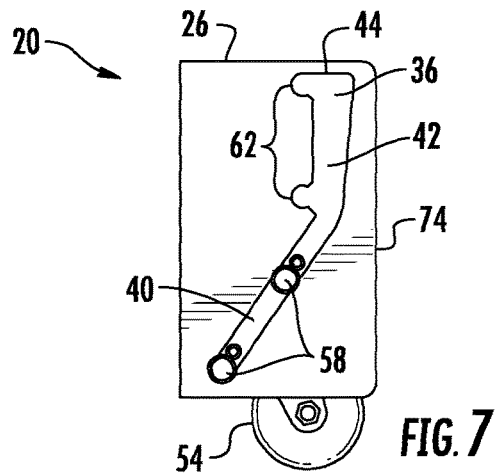
FIG. 7 is a diagrammatic side view of the assembly of FIG. 1, with the assembly in a vertical position and the wheel in a retracted position.

In FIG. 7 guide members 58 have fallen (via gravity) to first end 34 of slots 32. Accordingly, caster wheel assembly 24 is in first position, and wheel 54 does not extend past the bottom edge 74 of frame 26. Caster wheel assembly 24 is thus in a retracted position.

Figure 8:
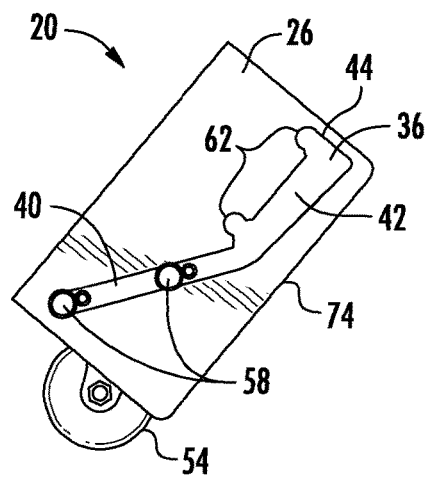
FIG. 8 is a diagrammatic side view of the assembly of FIG. 1, with the assembly in a slightly tilted position and the wheel in a retracted position.

In FIG. 8, frame 26 has been tiled approximately 45 degrees. Caster wheel assembly 24 has not moved relative to slots 32 yet, as the angle of first portion 40 has not yet passed horizontal.

Figure 9:
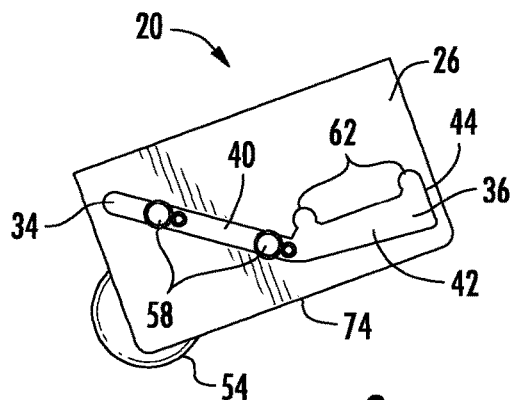
FIG. 9 is a diagrammatic side view of the assembly of FIG. 1, with the assembly in a more tilted position and the wheel moving from the retracted position toward an intermediate position.

In FIG. 9, frame 26 has been rotated further so that first portion 40 of slot 32 has passed horizontal. Guide members 58 have begun to slide (under the force of gravity) toward the second portion 42 of slot 32. Caster wheel assembly 24 is moving, and wheel 54 has passed the bottom edge 74 of frame 26.

Figure 10:
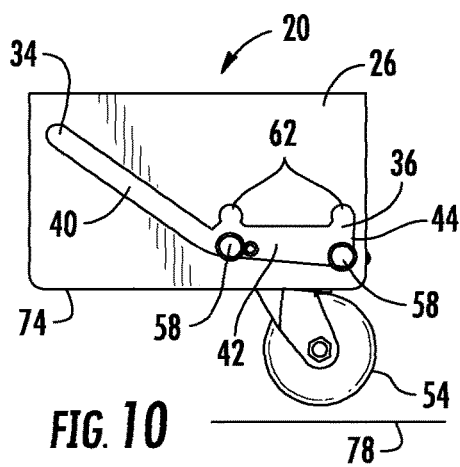
FIG. 10 is a diagrammatic side view of the assembly of FIG. 1, with the assembly in a horizontal position and the wheel in an intermediate position.

In FIG. 10, frame 26 has been tilted 90 degrees from the orientation of FIG. 7. Guide members 58 have moved to the second portion 42 of slot 32 and have impacted shoulder 44. Note that when frame 26 is in the horizontal position of FIG. 10, second portion 42 is angled from horizontal in a direction to allow gravity to urge caster wheel assembly 24 against shoulder 44. Note that wheel 54 is not contacting the ground 78, so the package in which retractable caster assembly 20 is located is being lifted off the ground. The position of caster wheel assembly 24 in slots 32 in FIG. 10 is considered an intermediate position.

Figure 11:
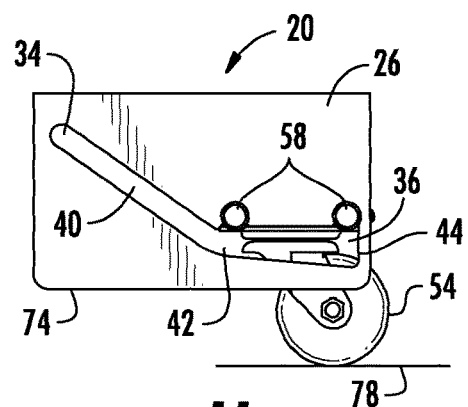
FIG. 11 is a diagrammatic side view of the assembly of FIG. 1, with the assembly in a horizontal position and the wheel in a deployed position.

In FIG. 11, the retractable caster assembly 20 (and its package 22) has been placed on the ground 78. Guide members 58 have slid up into retainers (indentations 46) of slot 32. Accordingly, the package to which caster wheel assembly 20 is attached can be readily wheeled across the ground 78 to a desired location.

Upon reaching a desired location, the package can be reoriented to stow caster wheel assembly 24 back within frame 26 by moving from the orientation of FIG. 11 back to the orientation of FIG. 7. The package can then be stored, stacked, put into a vehicle, etc. as desired, without a protruding wheel. If the package is to be moved again, the package is reoriented so that the caster assembly is in the orientation of FIG. 10 and can be put on the ground to reach the state of FIG. 11.

In view of the above, the disclosed structure provides a system and method for assembling a wheeled package. Retractable caster assemblies as disclosed above can be sold in bulk to a manufacturer, wholesaler or warehouse operator, retailer, etc. for use with packages. Packages can be designed so that cavities are initially covered by a rectangular perforated, foldable or otherwise removable area to expose the cavity when insertion of caster wheel assemblies is desired. Alternatively, the caster wheel assemblies could be manufactured already inside of the package and be made exposable if wheeled packaging were desired. Or caster wheel assemblies could simply be provided to be attached to packages in some way.

While preferred embodiments of the invention have been described above, it is to be understood that any and all equivalent realizations of the present invention are included within the scope and spirit thereof. Thus, the embodiments depicted are presented by way of example only and are not intended as limitations upon the present invention. While particular embodiments of the invention have been described and shown, it will be understood by those of ordinary skill in this art that the present invention is not limited thereto since many modifications can be made. Therefore, it is contemplated that any and all such embodiments are included in the present invention as may fall within the literal or equivalent scope of the appended claims.

I claim:

1. A method of assembling a wheeled package comprising the steps of:
   providing a package a having an exterior surface, the exterior surface defining at least one cavity; and inserting a retractable caster assembly at least partially into the cavity, the retractable caster assembly including a frame and a caster wheel assembly, the caster wheel assembly including a wheel and two guide members configured to be movable along slots within the frame so that when the caster wheel assembly is at a first end of the slots the wheel is in a retracted position substantially within the cavity, and so that when the caster wheel assembly is at a second end of the slots the wheel is in an extended position extending from the cavity, each second end including a shoulder defining an intermediate position for the caster wheel assembly and a receiver defining a locked position for the caster wheel assembly.

2. The method of claim 1, further including the step of: orienting the package so that the caster wheel assembly slides to the second end of the slots.

3. The method of claim 2, further including the step of: rolling the package on the wheels.

4. The method of claim 1, further including the step of: orienting the package so that the caster wheel assembly slides to the first end of the slots.

5. The method of claim 4, further including the step of: placing the package in a desired location.

6. The method of claim 1, wherein the receiver includes two indentations sized for receiving the guide members.

7. The method of claim 2, wherein the cavity, frame and caster wheel assembly are configured such that gravity may cause such free movement between the first and second ends of the slots during the orienting steps.

8. The method of claim 1, wherein the package has at least two of the cavities, and the method includes inserting a respective retractable caster assembly at least partially into each cavity.

9. A method of assembling a wheeled package comprising the steps of:
   providing a package a having an exterior surface, the exterior surface defining at least one cavity; and
   inserting a retractable caster assembly at least partially into the cavity, the retractable caster assembly including a frame and a caster wheel assembly, the caster wheel assembly including a wheel and two guide members configured to be movable along slots within the frame so that when the caster wheel assembly is at a first end of the slots the wheel is in a retracted position substantially within the cavity, and so that when the caster wheel assembly is at a second end of the slots the wheel is in an extended position extending from the cavity, wherein the frame has two plates spaced from each other, each plate defining one of the slots.

10. The method of claim 9, wherein each guide member includes a rod and at least one detachable fastener.

11. The method of claim 10, wherein each detachable fastener includes a fastener securable in an opening within a respective rod, the fastener having a head, the head and slots sized to cooperate maintain caster wheel assembly within the slots.

12. The method of claim 11, wherein each detachable fastener includes a cotter pin for securing the fastener to the respective rod.

13. The method of claim 11, wherein each rod defines an opening therethrough to form a hollow tube.

14. A method of assembling a wheeled package comprising the steps of:
   providing a package a having an exterior surface, the exterior surface defining at least one cavity; and
   inserting a retractable caster assembly at least partially into the cavity, the retractable caster assembly including a frame and a caster wheel assembly, the caster wheel assembly including a wheel and two guide members configured to be movable along slots within the frame so that when the caster wheel assembly is at a first end of the slots the wheel is in a retracted position substantially within the cavity, and so that when the caster wheel assembly is at a second end of the slots the wheel is in an extended position extending from the cavity, wherein the caster wheel assembly includes a body, a yoke attached to the body, an axle attached to the yoke, the wheel being rotatably mounted to the axle.

15. The method of claim 14, the caster wheel assembly further including at least one bearing assembly, the bearing assembly allowing the yoke to rotate relative to the body.

16. The method of claim 1, wherein the frame and caster wheel assembly are sized so that the caster wheel assembly may move freely between the first and second ends of the slots.

17. The method of claim 16, wherein the frame and caster wheel assembly are configured such that gravity may cause such free movement between the first and second ends of the slots when orientation of the frame is altered accordingly.

18. A method of assembling a wheeled package comprising the steps of:
   providing a package having an exterior surface, the exterior surface defining at least one cavity; and
   inserting a retractable caster assembly at least partially into the cavity, the retractable caster assembly including a frame and a caster wheel assembly, the caster wheel assembly including a wheel and two guide members configured to be movable along slots within the frame so that when the caster wheel assembly is at a first end of the slots the wheel is in a retracted position substantially within the cavity, and so that when the caster wheel assembly is at a second end of the slots the wheel is in an extended position extending from the cavity, each second end including a shoulder defining an intermediate position for the caster wheel assembly and a receiver defining a locked position for the caster wheel assembly, the receiver including two indentations sized for receiving the guide members, the frame having two plates spaced from each other, each plate defining one of the slots, each guide member including a rod and at least one detachable fastener, each detachable fastener including a fastener securable in an opening within a respective rod, the fastener having a head, the head and slots sized to cooperate maintain caster wheel assembly within the slots, wherein the caster wheel assembly includes a body, a yoke attached to the body, an axle attached to the yoke, the wheel being rotatably mounted to the axle, the caster wheel assembly further including at least one bearing assembly, the bearing assembly allowing the yoke to rotate relative to the body.

* * * * *